Aug. 19, 1952   B. NOBLE   2,607,555
MIXING PLANT
Filed March 9, 1950   8 Sheets-Sheet 1
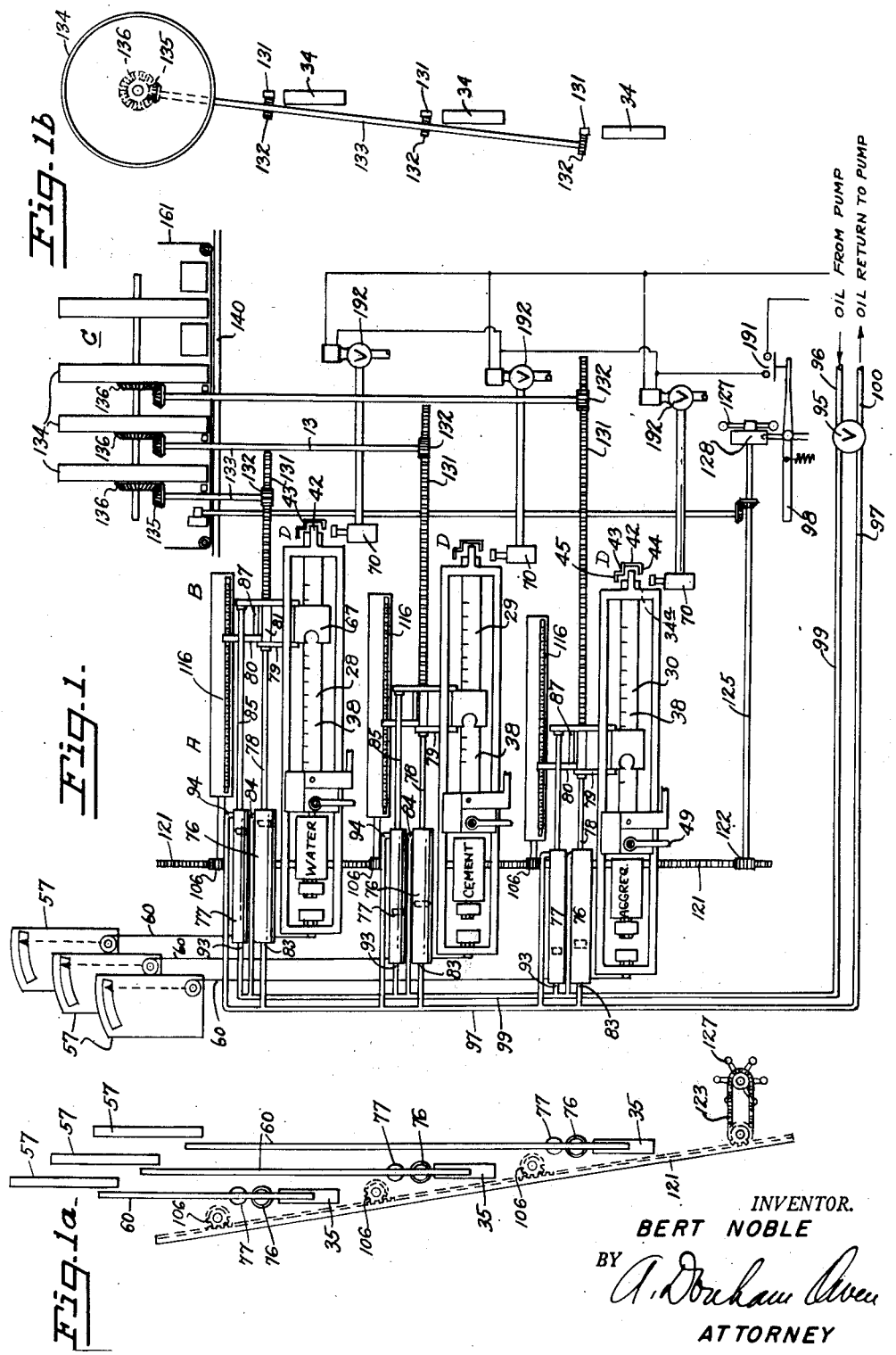
INVENTOR.
BERT NOBLE
BY
ATTORNEY

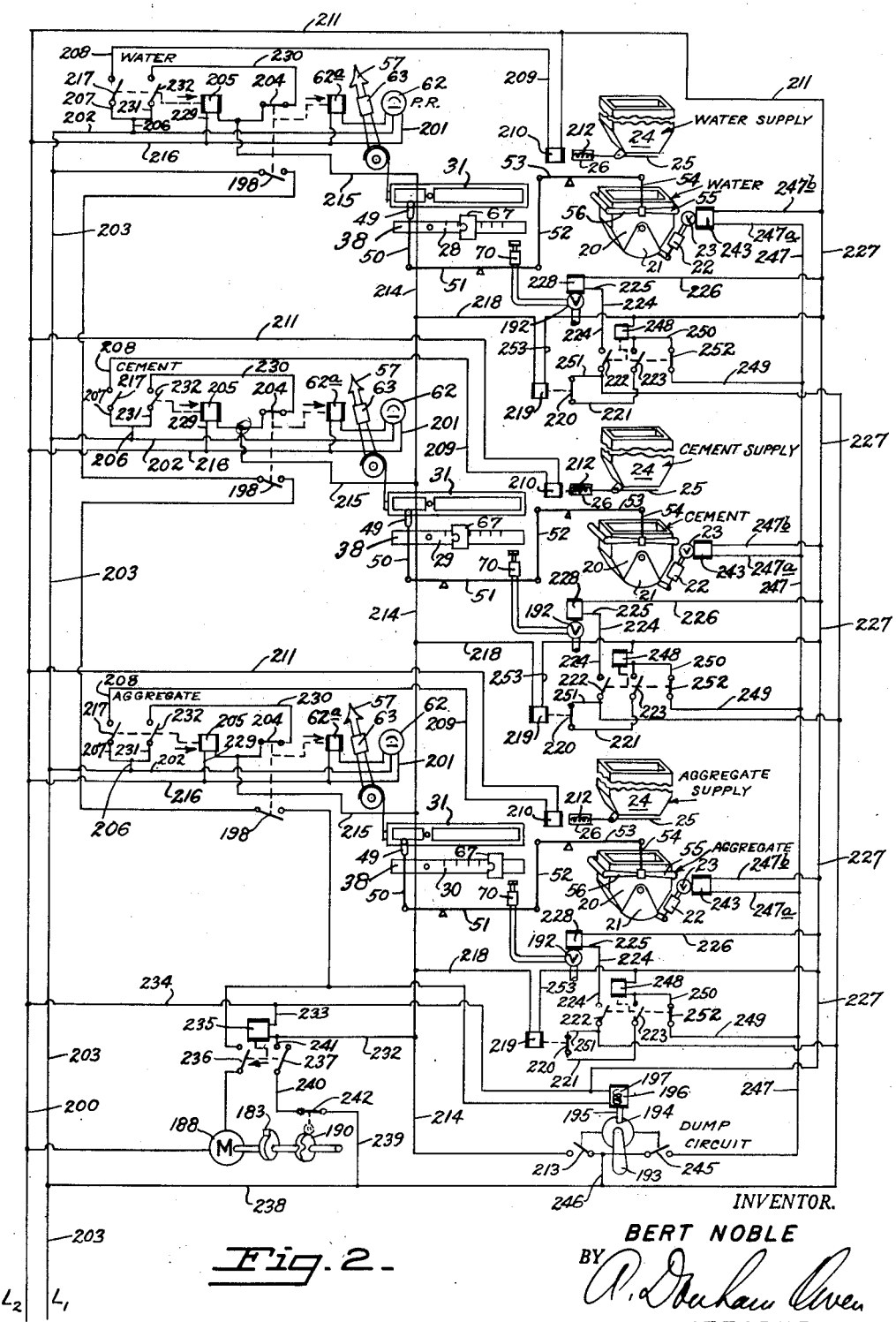

Aug. 19, 1952 — B. NOBLE — 2,607,555
MIXING PLANT
Filed March 9, 1950 — 8 Sheets-Sheet 3
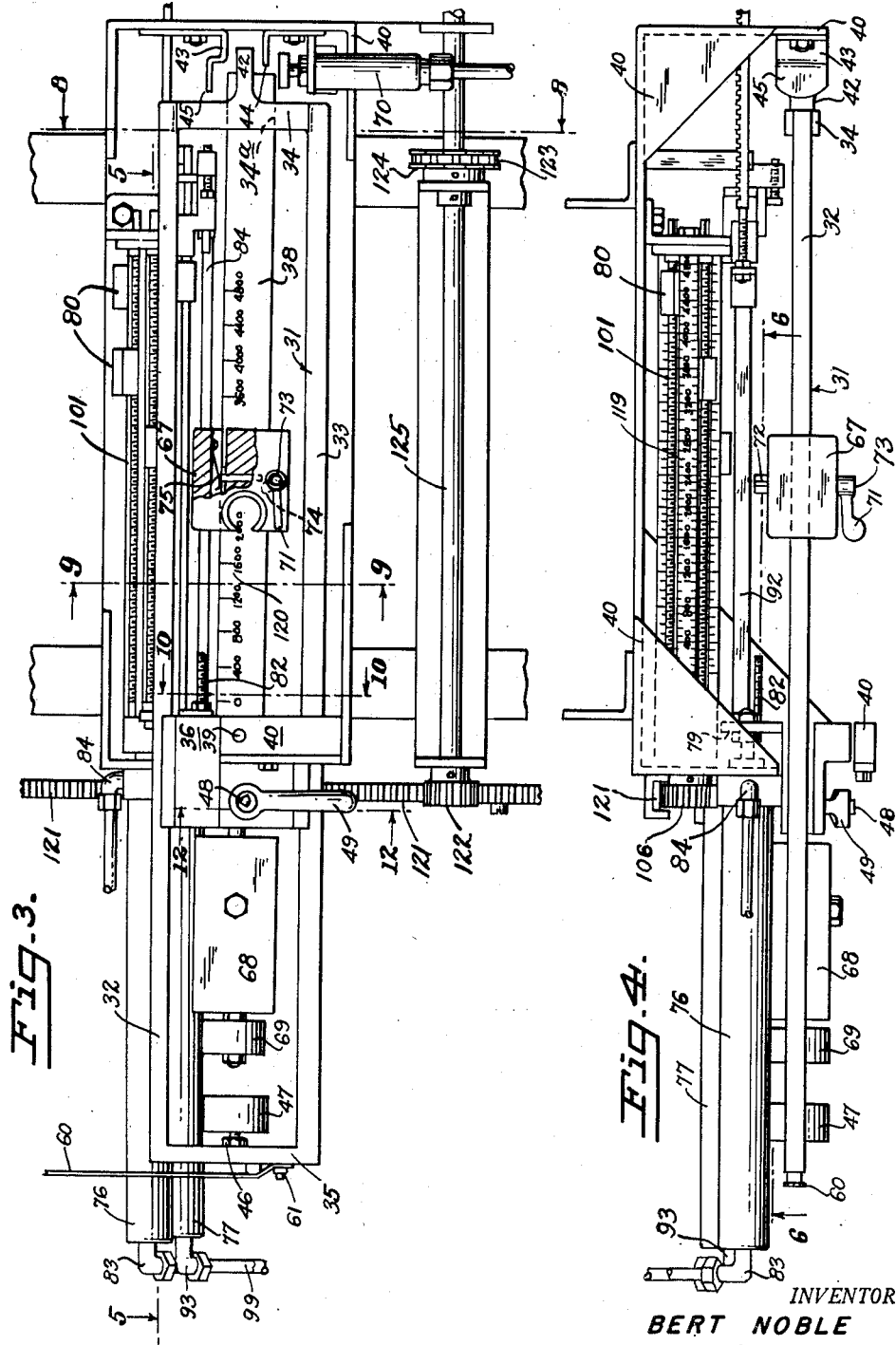
INVENTOR.
BERT NOBLE
BY
ATTORNEY Aug. 19, 1952 — B. NOBLE — 2,607,555
MIXING PLANT
Filed March 9, 1950 — 8 Sheets-Sheet 4
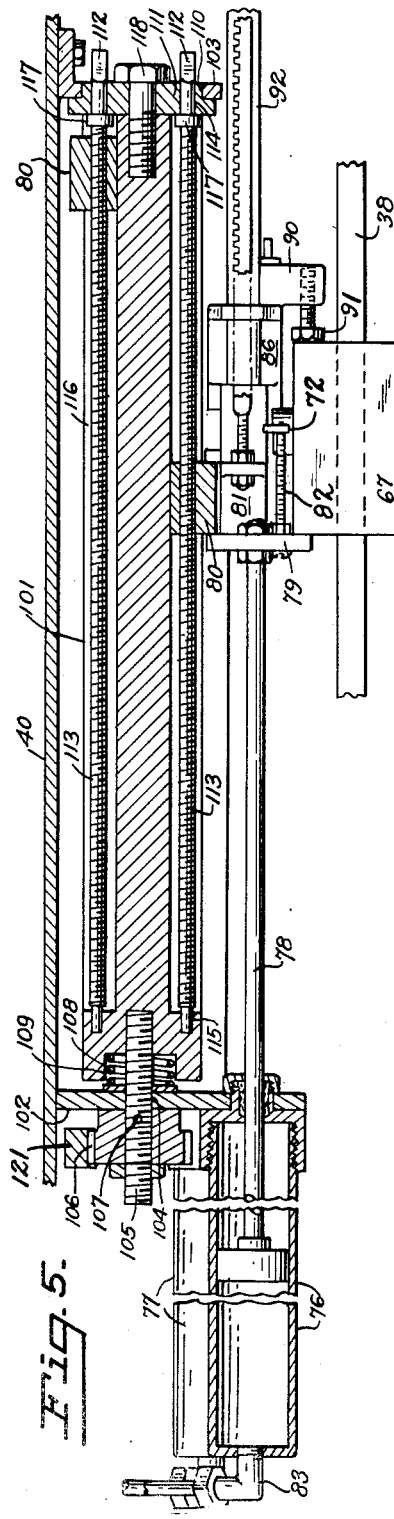
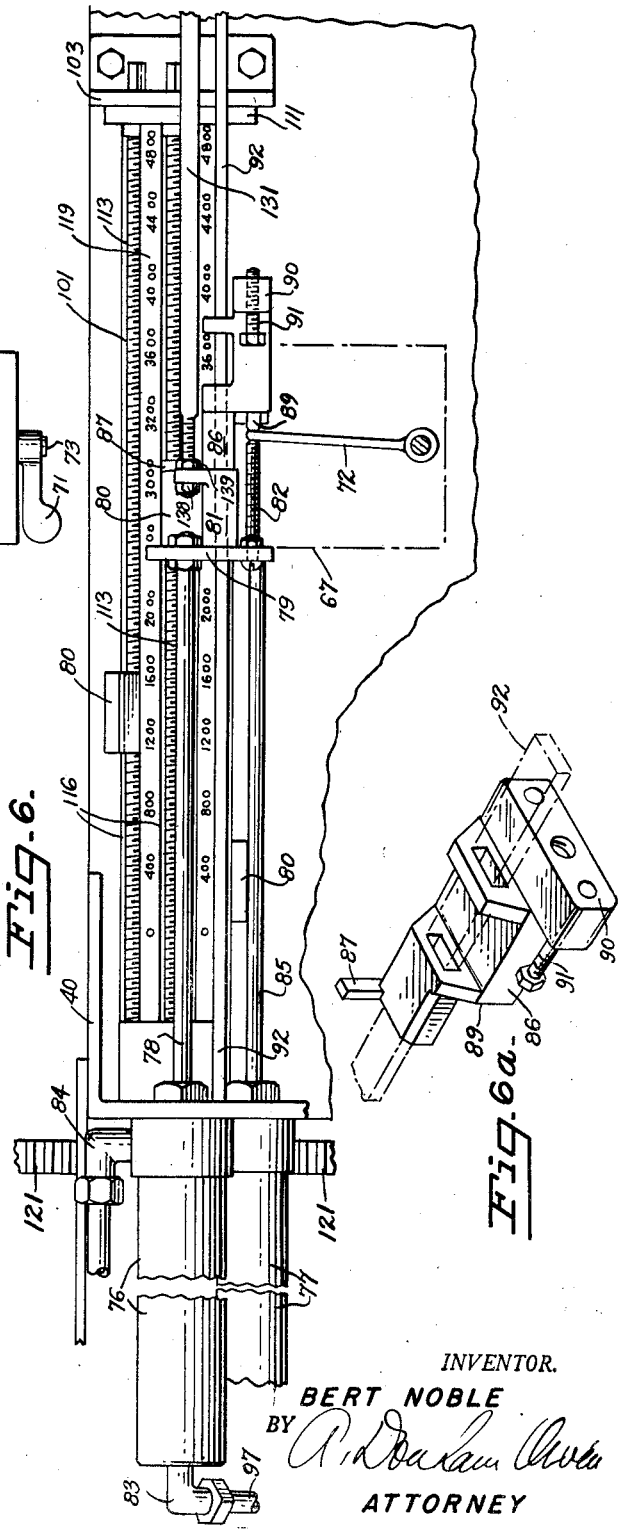
INVENTOR.
BERT NOBLE
BY
ATTORNEY Aug. 19, 1952  B. NOBLE  2,607,555
MIXING PLANT
Filed March 9, 1950  8 Sheets-Sheet 5

INVENTOR.
BERT NOBLE
BY *A. Douglas Owen*
ATTORNEY

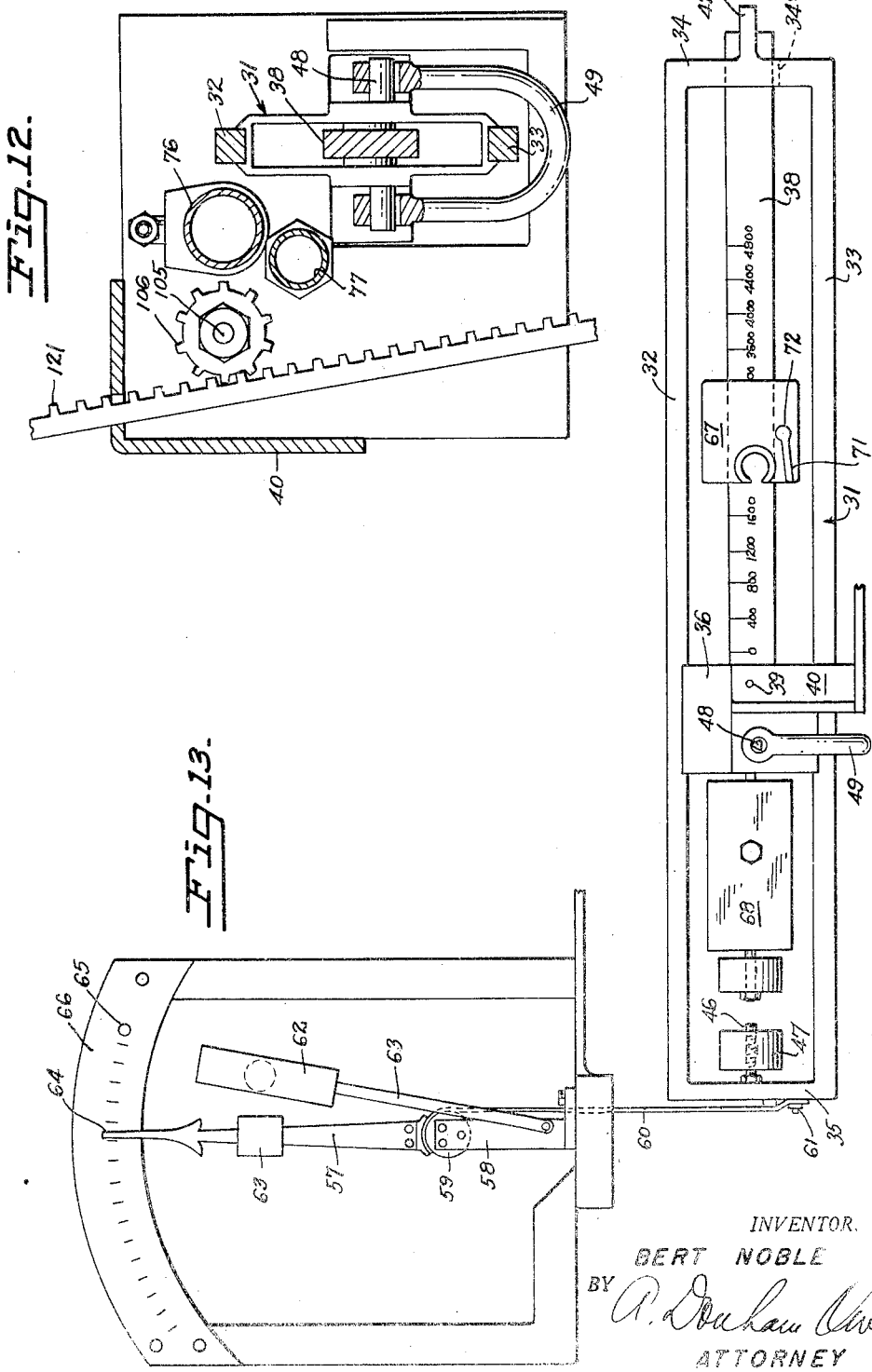

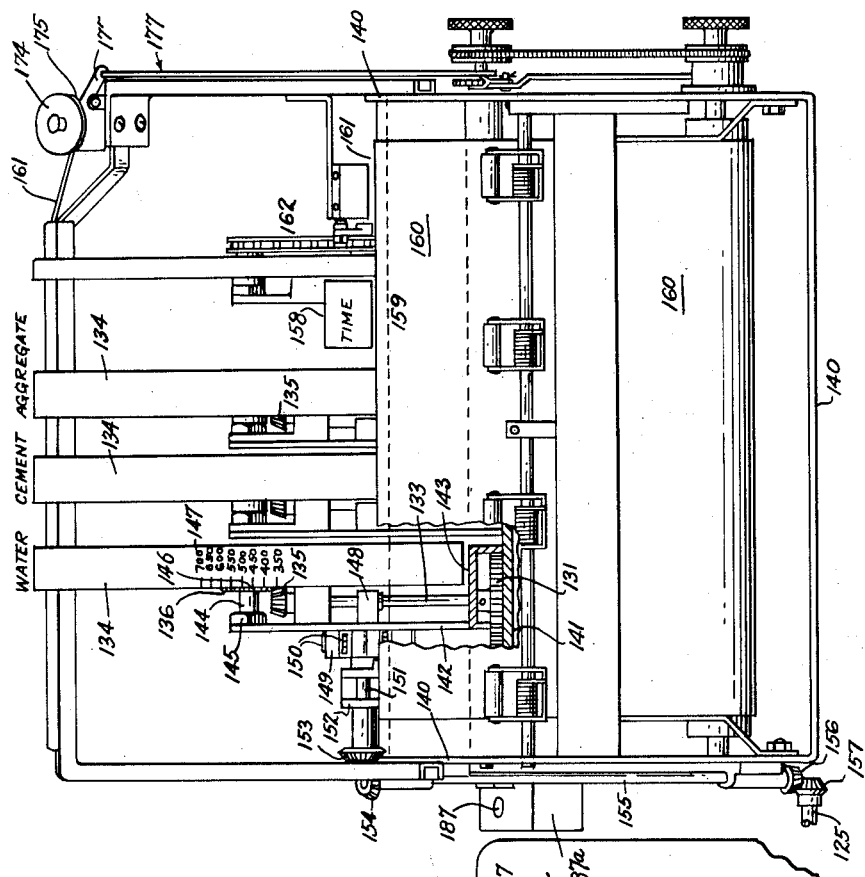
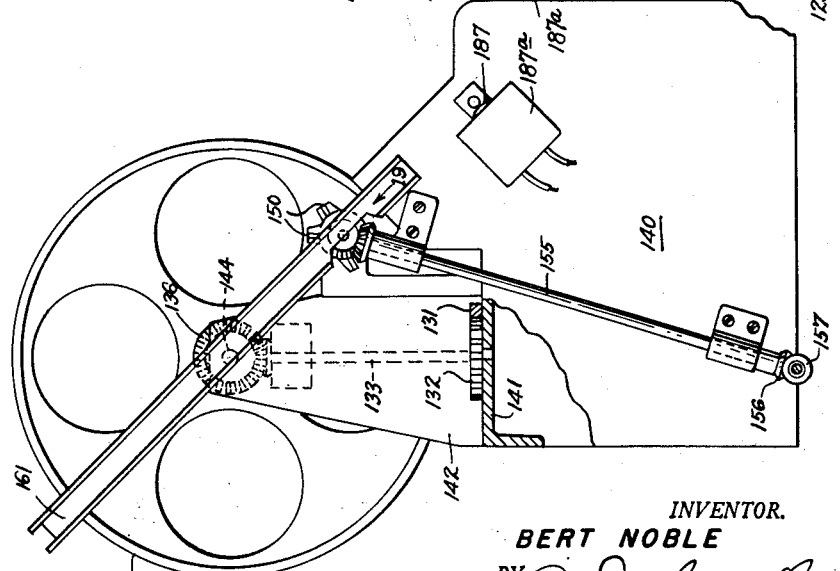

Aug. 19, 1952    B. NOBLE    2,607,555
MIXING PLANT
Filed March 9, 1950    8 Sheets-Sheet 8
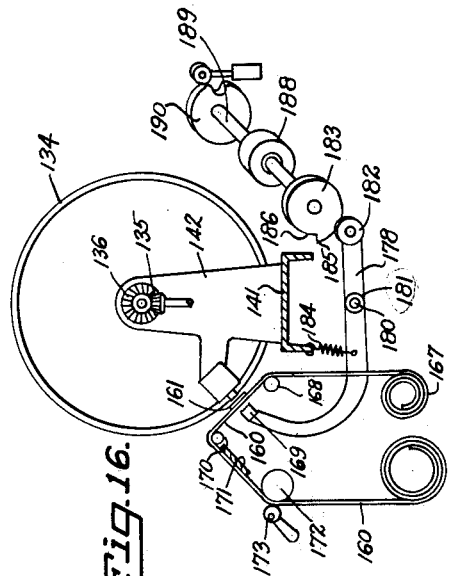
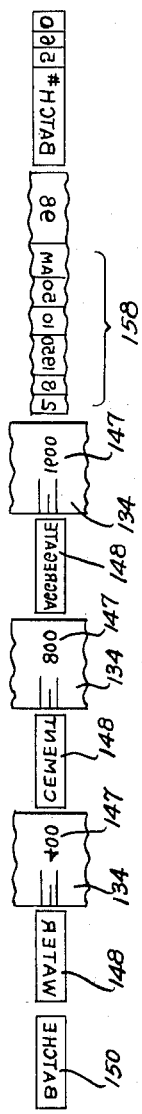
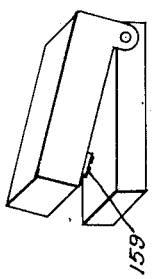
INVENTOR.
BERT NOBLE
BY
ATTORNEY Patented Aug. 19, 1952

2,607,555

UNITED STATES PATENT OFFICE 2,607,555

MIXING PLANT

Bert Noble, Winters, Calif.

Application March 9, 1950, Serial No. 148,665

29 Claims. (Cl. 249—14)

This invention relates to batching plants and in particular to such plants in which a plurality of elements are to be weighed out simultaneously in various pre-selected combinations each of pre-determined proportions of the several elements.

The object of the invention is to provide a weighing and batching mechanism by which several different pre-selected weights of each aggregate can be arranged to be weighed selectively on a given batcher scale and in which the pre-selected weight settings of each aggregate can be reset at any time without interfering with the weighing mechanism; and in which once any selected weight setting has been made effective to position the poise on the batcher scale mechanism, there is no further connection between the setting mechanism and the scale mechanism; and in which for each material weighed up on each scale mechanism a corresponding weight setting is recorded on a record tape.

Some of the problems solved by this invention are as follows:

Modern construction projects, such as dams and other large structures of concrete, are usually carried on with several different parts of the concrete structure being poured simultaneously. Different parts, such as the power house, the spillway, the diversion tunnels, the outside face of the dam, the mass concrete, the railings, the buckets, etc., call for concrete having different characteristics. These characteristics are determined by the relative proportions of the various sizes of aggregate, and cement and water. Sometimes ice and other elements are added to the mix. This means that the modern batching plant must have a means of making instantaneous changes to a pre-selected mix without taking the operator's time from other duties or having to rely upon his noting the weights changed to. The modern batching plant must be equipped to mix in succession batches of different pre-selected composition and to do this under the control of the operator, but requiring no more of his time than is necessary to operate the control means to select the desired mix. Although a concrete batching plant is mentioned, the device is equally useful in chemical plants and other plants weighing bulk materials.

One problem solved by the present machine in relation to earlier devices is in providing a mechanism so simple that only one scale beam is needed for each element of the mix, and in having the poise on that scale beam adapted to be positioned in any pre-selected position along the beam by a plurality of means adjacent to it.

Another problem solved by the present invention in relation to earlier devices is that here the selection of weight settings for the several elements of a mix can be made while the weighing of another mix is being carried on. This is because the weight selection mechanism is independent of the scale mechanism at all times except during the short interval when the poise on the scale is being moved into position for a particular mix by the weight selection mechanism. In other words, the mechanism for setting up the pre-selected weights to be used in the various mixes has no permanent connection with the scale mechanism.

Another problem solved by the present invention is to remove heretofore unavoidable inaccuracies in the positioning of the poise on each scale beam. With the structure of the present device it is possible to utilize all the power necessary to move the poise and to have its position controlled by a micrometer-like mechanism.

Another problem solved is overcoming the heretofore necessarily delicate nature of the mix control apparatus, effected here by complete separation of this apparatus from the weighing mechanism at all times except during the short interval when the poise is being moved by the mix control apparatus. This makes possible a rugged, foolproof, easily maintained mechanism which requires a minimum of servicing by the user.

Heretofore, the delicate nature of the mix control apparatus has made it possible to use only an equally delicate recording means to record each scale setting. Whereas the present device is separate from the weighing mechanism, as above noted, and unlimited power is available to move the poise, it is possible now to actuate through gears or other linkage, record printing mechanisms so that the number of pounds of material will be printed on the record sheet and can be read without interpolation.

In those cases where a plurality of scales and batchers are operated together to weigh out a predetermined amount of each material, the present device makes it possible to have all the data such as the date, the batch number, the time, the type of mix, the location in the structure where it is to be used, the names of the elements in the batch and the predetermined weights of each, for each composite batch printed on one line on a strip of recording paper. To assure the user that each scale actually weights out each time the amount of material for which the poise is set a mechanism, operated by each scale, is arranged to control the dumping and the starting circuits so that unless each scale comes to a position of balance when empty or when loaded, the device cannot dump its load or start a new weighing cycle until the error is corrected.

Another important problem solved is in having the weight control means effective on parts which have a large range of movement so that the tolerances can be large and thereby promote greater accuracy in measuring.

For purposes of disclosure the invention will be described as one for weighing up any one of six pre-selected mixes composed of water, cement and aggregate. This will permit the drawings and the description to be kept relatively simple while still making a full disclosure of the principles of the invention. In actual practice most mixes will contain more than water, cement and aggregate in which case the basic elements of the machine are duplicated as explained herein. Also more or fewer than six pre-selected mixes may be provided for in each positioning mechanism.

In the drawings:

Fig. 1 is a vertical diagrammatic view of the primary weighing, positioning and printing elements comprising one form of the invention and showing the interconnection of the several elements;

Fig. 1a is a vertical diagrammatic view looking at the left end of Fig. 1 showing only the parts near that end;

Fig. 1b is a vertical diagrammatic view looking at the right end of Fig. 1 showing only the parts near that end;

Fig. 2 is a vertical diagrammatic showing of the electrical circuits and the controls for operation of the supply hoppers and the weigh hoppers;

Fig. 3 is a view in vertical elevation showing one of the scale beam mechanisms with its associated poise positioning mechanism;

Fig. 4 is a plan view looking down on the device of Fig. 3;

Fig. 5 is a plan view partly in cross section taken generally along the line 5—5 of Fig. 3;

Fig. 6 is a view in vertical elevation taken generally along the line 6—6 of Fig. 4, but with the poise positioning cross arms extended in the act of positioning the poise and the positioning foot of the printer;

Fig. 6a is a view in perspective of the right hand positioning cross arm;

Fig. 12 is a detail fragmentary view in vertical elevation taken about on the line 12—12 of Fig. 3;

Fig. 13 is a view in vertical elevation showing a master scale beam and an ingredient scale beam in relation to the dial mechanism;

Fig. 14 is a front view in vertical elevation partly cut away and showing one form of printing mechanism;

Fig. 15 is an end vertical view of the device of Fig. 14, looking at it facing the left end and partly cut away to show details;

Fig. 16 is a diagrammatic cross-sectional view in vertical elevation of the printer;

Fig. 17 is a like view of the printing wheel for recording the destination of the mix;

Fig. 18 is a view in perspective showing the working end of a time and date recorder; and Fig. 19 is a fragmentary view of the printing wheels and fixed printing blocks in position ready to print the data regarding a batch. It is taken in the direction of the arrow 19 in Fig. 15.

Figure 7:
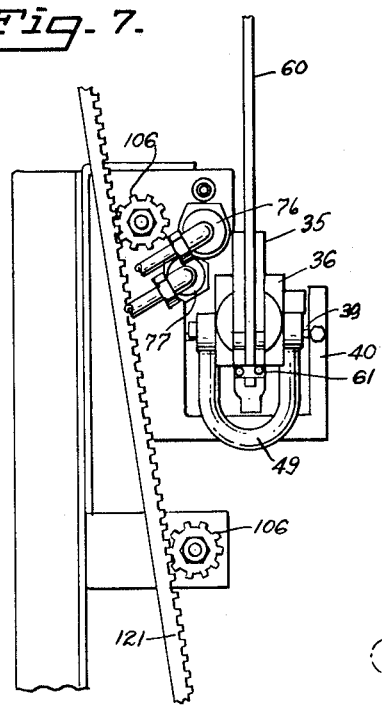
Fig. 7 is an end vertical view of Fig. 3 looking at it facing the left end.
Figure 8:
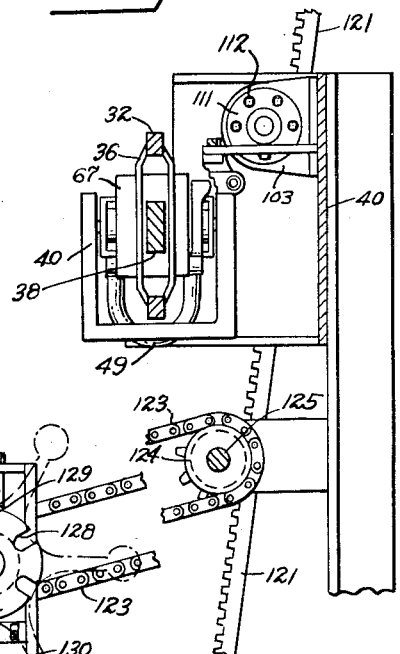
Fig. 8 is a similar view of Fig. 3 looking at it facing the right end and taken about on the line 8—8 of Fig. 3.
Figure 11:
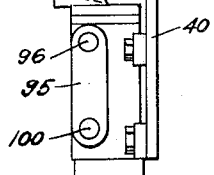
Fig. 11 is a view in vertical side elevation showing the stop indexing wheel and the poise positioning change lever.

In presenting this description and embodiment of the invention it is not intended thereby to limit the invention to this one embodiment as each manufacturer may vary each of the elements which make up the combination covered by the claims.

Broadly, the device is composed of a remotely controlled pre-selector mechanism A, a poise positioning device B, and a printing mechanism C, combined with a batching plant having an individual weighing mechanism D for each element that is to go into the mix. Such a batching plant is shown in my Patent No. 2,527,147, granted October 24, 1950. A specific form of the device claimed broadly herein, is shown in my copending application Serial No. 101,817, filed June 28, 1949. So far as possible the details in the present description will be confined to the pre-selector mechanism, to the poise positioner, and to the printing mechanism taken in connection with the combination of the batching plant. A single unit composed of the pre-selector, the poise positioning device and the printer together with a storage hopper and a weigh hopper may be found very useful in weighing out different predetermined quantities of a single material. A plurality of materials may be weighed out in succession in a single weigh hopper if the storage hoppers are arranged to empty into that weigh hopper.

THE BATCHING PLANT

As shown in the foregoing application, the batching plant is composed of a plurality of batchers each having its own weigh hopper 20 in each of which is weighed out the amount of its particular element that is to go into a selected mix. Each weigh hopper has a gate 21 and a ram 22 for opening the gate. A magnetic air valve 23 regulates the flow of air to one end of the ram and a spring moves the ram to close the gate. Above each weigh hopper 20 is a storage hopper 24 also having a gate 25 and a ram 26 controlled by a magnetic air valve 27 to open and close the gate.

To avoid complication the batcher will be assumed to be one having only three separate batching means, each with its scale beam 28 for water, 29 for cement, and 30 for the aggregate. In most installations there will be more than three batchers, but three are sufficient to illustrate the principles of the present invention.

It is important in the present invention to be able to move each poise on each scale beam 28, 29 and 30 from wherever it may be along the beam, in accordance with predetermined selected weight settings, and to do this by means which have no connection with the scale or with the poise except during the short interval when the poise is being moved.

The pre-selector mechanism A and the poise positioning mechanism B and the printing mechanism C are shown diagrammatically in Figs. 1, 1a and 1b.

THE SCALE MECHANISM

The master scale beam

Figure 10:
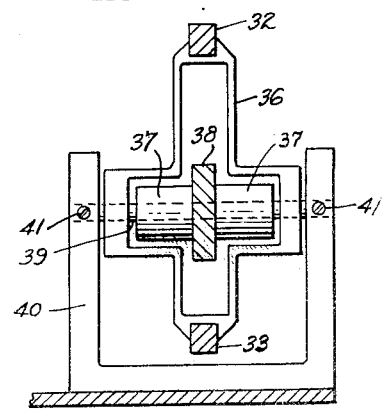
Fig. 10 is a detail fragmentary view in vertical cross section taken generally on the line 10—10 of Fig. 3, but showing only the scale beams and their mounting.

The invention is not limited to any particular form of scale. The one shown for purposes of illustrating the invention comprises a novel form of master scale beam which is to be the subject of a separate application for patent. The master scale beam 31 has a hollow construction made up of the upper bar 32, the lower bar 33, the rectangular end members 34, 35, and the intermediate member 36 spaced apart (Fig. 10) to receive within it the bearing extensions 37 of the ingredient scale beam 38. Both scale beams are pivoted on the same shaft 39 secured in the scale frame 40 by the set screws 41.

The end member 34 of the master scale beam has a connecting loop 42 which extends beyond the bars 32, 33 and serves to limit the range of movement of the scale beam between the upper stop 43 and the lower stop 44 secured to the scale frame 40.

The upper stop has an extension 45 which serves as a stop against which to rigidly position the ingredient scale beam 38 when it is supported momentarily (a) during the poise moving interval and (b) for an interval after the weigh hoppers have dumped their loads so the operator can get an indication that all the weigh hoppers are empty before he starts another weighing cycle. Except when supported against the stop 45 the ingredient scale beam 38 rests on the cross bar 34a in the end member 34.

The end member 35 has a threaded extension 46 on which a compensating weight 47 is threaded so the master scale beam can be adjusted to perfect balance.

The intermediate member 36 has a suitable frictionless pivot 48 spaced from the shaft 39, and adapted to receive the loop 49 which is connected by the link 50 to the lever 51, the other end of which is connected by the link 52 to the lever 53, the other end of which is connected by the link 54 to the splice levers 55, 56, which support the weigh hopper 20. The master scale beam is adjusted to be in balance when the hopper 20 is empty.

The range of movement of the end member 42 of the master scale beam is limited by the stops 43 and 44 so to multiply this movement for purposes of control and easy reading, a pivoted arm 57 is journaled on a horizontal axis in the scale frame work 58. The arm has a hub 59 to which a metal strap 60 is secured. When the strap is pulled down it moves the arm to the right. When the strap is allowed to move upwardly the arm is weighted just enough so it moves to the left. The lower end of the strap is secured to the end of the master scale beam at 61. A photo-electric cell 62 is mounted on an arm 63 adjacent the path of the arm 57 and the latter has a flag 63 so positioned that when the flag intercepts the light beam on the cell 62, the pointer 64 will be at the zero reading 65 on the scale 66 and the master scale will be in balance.

Balancing the master scale beam

The master scale beam should come into balance so the arm 57 will carry the flag 63 to intercept the photo relay 62 under two different conditions, (a) when the weigh hopper is empty and (b) when the weigh hopper holds the predetermined quantity of material it is to measure out. This calls for the presence of the ingredient scale beam 38 so that when it is desired to weigh out into the weigh hopper 20 a given amount of material the poise 67 on the beam 38 is set for that amount, then the weight of the beam 38 is added to the master scale beam by letting it come to rest on the cross bar 34a. When the given weight of material has flowed into the weigh hopper the master scale beam comes into balance and moves the arm 57 to where it registers zero on the scale 77 and the flag 63 intercepts the photo relay 62. This conditions the control circuits so that when all of the scales read zero the material held in the several weigh hoppers can be dumped. Unless they all read zero the dump circuit is not complete and therefore the operator knows some weight is wrong in one or more of the weigh hoppers. When the error is corrected the hoppers can be dumped, but not before. When the dump valves have been opened it is important for the operator to be sure that the material has emptied from each weigh hopper so that the batch just dumped will not lack in the correct amount of each ingredient when mixed and set in place in the structure. This he can ascertain if all the scale hands 57 point to zero when at the completion of the dumping operation the weight of each ingredient beam 38 is lifted off the cross arm 34a on its master scale beam.

The ingredient scale beam

The ingredient scale beam 38 may be positioned below the master scale beam (as in the prior art) or it may be placed within the novel hollow master beam 31 as shown here. Being pivoted in the scale frame 40 on the shaft 39, it can be brought into balance with the counterweights 68 and 69 when the poise 67 is at its zero setting. When the poise is moved away from the zero setting the end of the scale beam 38 will lie on the cross arm 34a of the master scale thereby in effect making itself one with the master scale. The operator can ascertain if the master scale itself is balanced at zero (which it should be when there is no material in the weigh hopper 20) at any time during the cycle from the time the dump circuit is closed until the starting circuit is energized. During this time the lock out rams 70 support each ingredient beam 38 rigidly against the stop 45 and leave each master scale beam free of the weight of its associated ingredient beam. The lock out ram 70 also supports the ingredient beam 38 during the time when the poise positioning mechanism is in use.

The poise and its brake

The poise 67 must be able to slide freely on the beam 38 but once the poise is positioned where desired, it is important that it be not moved by any vibration or jolting of the scale. Any suitable releasable brake will suffice. The one shown here has a release lever 71 on the front side and a release lever 72 on the back side, each secured to a shaft 73 having a cam 74 which acts to lift the brake 75 when the shaft 73 is rotated in either direction. The mechanical means for moving the poise 67 to any desired place along the beam 38 involves first contacting the brake release lever 72. If the poise is to be moved by hand the lever 71 on the front can be used.

THE POSITIONING MECHANISM

Generally speaking, the purpose of the positioning mechanism is to have for each ingredient beam a device on which a plurality of different weight settings can be arranged for in advance and from which the operator can choose and when a choice is made the mechanism is such that when set in operation it will move the poise 67 on each scale beam 38 and the printing wheel for that scale beam, to a position corresponding to the pre-arranged weight. It is important that the positioning mechanism should be only in engagement with the poise 67 during the positioning operation. This leaves the scale free of any drag or of any interference with its functioning perfectly in weighing.

The positioning rams

Mounted on the scale frame 40 to the left of the pivot point of the scale beam 38 and in substantial alignment with it are a pair of rams 76 and 77, each with a ram rod.

The ram rod 78 in the ram 76 carries a cross arm 79 which is wide enough to engage the left face of the poise 67, the left face of the stop or positioner 80, and the left face of the positioning foot 81 on the printer rack. It also has an adjustable projection 82 to engage the brake release lever 72 on the poise so the poise is free to move along the beam 38. Fluid under pressure is used to moved the ram rod 78 and is introduced at the ends of the ram housing through fittings 83 and 84.

The ram rod 85 in the ram 77 also carries a cross arm 86 having, in this instance, several projections (see Fig. 6a) adapted (a) to engage the brake lever 72 and to push the poise 67, and the positioning foot 81, toward the stop 80 when the poise and foot lie to the right of the stop or (b) to come against the stop 80 and prevent overtravel of the poise 67 and the printer positioning foot 81 when the latter lie to the left of the stop 80 and are brought up to the stop by the cross arm 79. On the cross arm 86 is the projection 87 which will engage the right end of the stop 80; the projection 88 which will engage the right end of the printer positioning foot 81; the projection 89 which will engage the brake release lever 72; and the projection 90 which includes an adjustable screw 91 to engage the right end of the poise 67.

The cross arm 79, the cross arm 86, and the printer positioning foot 81 are each slidably supported on a guide member 92 mounted in the scale frame 40, and could be described also as a traveler engageable momentarily with the poise 67 for moving it along the scale beam 38.

Fluid under pressure to move the ram rod 85 is introduced at the ends of the ram housing through fittings 93 and 94.

The valve 95 for controlling the movement of the rams is shown only diagrammatically because it is a well known form of four way valve by means of which the fluid coming through the conduit 96 from the pump will be introduced into the conduit 97 when the control lever 98 is depressed. The fluid being forced out of the rams into the conduit 99 will pass out through the conduit 100 back to the pump. When the poise 67 is positioned the operator will lift the lever 98 which will move the valve 95 so as to connect the fluid under pressure in the conduit 96 to the conduit 99 and the fluid being forced out of the rams will pass out through the conduit 100. Other means of moving the cross arms 79 and 86 may be used, but the above will illustrate one way of accomplishing the result.

I prefer that one or the other of the rams 76 or 77 be larger than the other so that in positioning the poise 67 there will be a margin of power of one ram over the other to assure that each time the poise 67 is moved it will always be brought into alignment with the same edge of the stop 80. Said in another way, by having one ram stronger than the other, the cross arm on the stronger one will take up a firm and for the moment immovable position against the stop 80, then the cross arm on the weaker ram will press the poise 67, and the printer positioning foot 81 against the opposing cross arm. For the period of energization, it is as if the cross arm on the stronger ram were an extension of the stop 80. In the illustrative device the ram 76 with the cross arm 79 is the stronger one.

The poise stop mechanism

The purpose of the poise stop mechanism is several fold: For example, it provides a way of giving each scale a plurality of pre-selected weight settings to which its poise can be moved automatically. It provides a way of moving one or more of the stops 80 to new positions with great accuracy and without interfering with the operation of a weighing cycle which may be under way. It provides a way of removing the human equation in measuring out elements for a mix, where, as in drugs or in cement for a dam, mistakes in proportioning can have far reaching effects.

While, for purposes of illustration, I have shown six stops on the turret, more or fewer may be included depending upon the number of different pre-selected weight settings it is necessary to keep set up on a single scale.

The turret head

In the drawings (Figs. 4 and 5) the poise stop mechanism is shown in the form of a turret head 101 rotatably mounted in brackets 102, 103, secured to the scale frame 40 so as to be adjacent to and substantially parallel with the ingredient scale beam 38 when the latter is being held rigidly by the lock out ram 70. The reason for these being substantially parallel at this time is to assure like engagement of the ram cross arms 79 and 86 with the poise 67 regardless of where the stop 80 may be along the turret head.

The bracket 102 provides a bearing 104 for the shaft 105 on which the left end of the turret is supported. This shaft is non-rotatably secured in the end of the turret and also has a drive pinion 106 keyed to it by a pin 107. A spring 108 fits a recess 109 in the end of the turret and serves to keep the latter at all times in firm contact with the bracket 103. This gives the turret a fixed longitudinal position in relation to the scale beam 38.

The bracket 103 has a large bearing surface 110 adapted to receive a mating bearing part 111 which forms the end of the turret. The large opening 118 gives room for the squared ends 112 of the stop adjusting screws 113 to project beyond the end of the turret where they may be engaged easily with a wrench or preferably with a calibrated crank mechanism in which the calibrations are in smaller units of weight than are printed at 119 along the turret. The screws 113 are journaled at 114 in the bearing part 111 and at 115 in the other end of the turret. The turret has longitudinal splines 116 along which the screws extend. Each stop 80 fits in a spline with a sliding fit and is threaded onto its screw 113 so it can be moved longitudinally along its spline by turning its screw end 112. A collar 117 on the screw controls the end play allowed to each screw in its spline or slot. A cap screw 118 threaded into the turret through the bearing part 111 holds each turret assembled.

From the description of the turret thus far, it is seen that there is provided a plurality of stops 80, which can each be moved longitudinally in the turret to any desired position along its spline. On the turret body between the splines, calibrations 119 may be engraved which will correspond with the calibrations 120 on the ingredient scale beam 38.

Where the plant is to have several scales and several weigh hoppers 20 as shown diagrammatically in Figs. 1 and 2, the most desirable form of the invention is to have the several turrets connected together so that an operator can rotate a single wheel and thereby simultaneously rotate all the turrets. This connection can be effected in several ways and for illustration I show it by means of a rack 121 mounted in the machine frame so it engages the pinions 106 on each turret. Then I provide a pinion 122 also in engagement with the teeth of the rack. A chain 123 runs over a sprocket 124 secured to the pinion 122 on the shaft 125. The chain also runs over a sprocket 126 secured to a hand wheel 127 which has indexing slots 128 releasably engaged by a spring pressed holding ball 129 and also engageable by a locking pin 130 whenever the operator moves the lever 98 downwardly to reposition the poise 67 on the scale beams.

Figure 9:
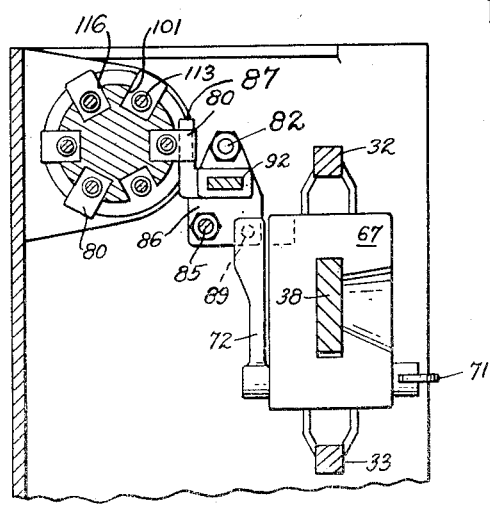
Fig. 9 is a view in vertical cross section taken about on the line 9—9 of Fig. 3.

The turret illustrated has six splines and six stops so there are six slots 128 in the indexing wheel 127. The gear ratio is such that the turret will rotate once if the wheel 127 is rotated once. Also the slots are spaced so that when held by the ball 129 and aligned with the locking pin 130, one of the stops 80 will be positioned correctly to be engaged by the cross arms 79 and 86 of the positioner rams (see Fig. 9).

From the foregoing description of the plurality of turret heads, it will be seen that if there are six stops 80 on each turret, and if the turrets are connected together by means of the rack 121 or any equivalent connecting mechanism, there can be six different mix combinations set up and available to the operator. All he has to do is to turn the index wheel 127 to select either batch A, B, C, D, E, or F.

On batch B the turret on the water scale may be set with the stop positioned to weigh out 500 pounds of water. On batch A 450 pounds, on batch E 400 pounds, and so on.

Likewise, the turret on the cement scale may be set with its stops 80 positioned to weigh out 700 pounds of cement for batch B, 850 pounds on batch A, and 800 pounds on batch E, and so on. The turret on the aggregate scale can have its stops set to weigh out 1400 pounds of aggregate for batch B, 1500 pounds on batch A, 1600 pounds on batch E, and so on.

When the operator turns the selector wheel 127 to batch E, for example, one stop 80 on each turret will be positioned in relation to an adjacent ingredient scale beam 38 so that when the ram cross arms 79 and 86 on each scale take hold of the several poises 67 they will move each poise on its beam so the water weigh hopper 20 will be set to weigh out 400 pounds, the cement weigh hopper 20 will be set to weigh out 800 pounds, and the aggregate weigh hopper will be set to weigh out 1600 pounds.

Even while the machine is weighing out batch B, for example, the operator can turn the selector wheel 127 to prepare to measure out batch E on the next weighing cycle. Also while the weighing is going on the operator may reset any individual stop 80 on any turret by rotating its screw 113 to move it to a new weight setting.

THE PRINTING MECHANISM

One of the important improvements effected by this invention is the provision of a printing mechanism which will print on a tape in easily read words and figures all the data the operator needs. An example is for government inspectors where the device is being used on some public works project. Such projects cost many millions of dollars and any failure of the cement due to improper proportioning can mean irreparable money loss as well as possible loss of life in the case of a dam breaking. Therefore, it is to the contractors', as well as to the government's, interest to have a record of what mix went into each part of the structure. The present machine makes it possible to print across a paper tape any desired information about the mix.

To illustrate the invention, the mechanism is arranged to show the batch code letter, the name and weight of each of the several elements going into the mix, the date and time of day, a number to indicate the destination of the batch, and the serial number of the batch. On the machine here described using three weigh hoppers, the information printed on the paper would read as shown upside down in Fig. 19: Batch E—Water 400—Cement 800—Aggregate 1600—2-8-50—10:50 am—86—Batch #560. This is what would be printed on the tape if the operator had weighed out a batch with the selector wheel set at batch E. One reason I am able to print such complete information and to get away from the delicate recording graphs of the prior art which are actuated by direct connections to the scale beams, and really interfere with accurate weighing, is because I have severed all connection between the printing mechanism and the scale beam during the weighing cycle. The printing mechanism for each element is set and is made ready to print at the time the poise on each scale beam is being positioned by the power rams. This is before the weighing cycle begins.

The printer

As shown diagrammatically in Fig. 1, the printer C is located near enough to the scales to have the racks 131 within easy reach of the pinions 132 which are secured to the shafts 133 that rotate the printing wheels 134 through the bevel gears 135, 136.

The end of the rack 131 toward the scale comes in alongside the ingredient scale beam 38 and is threaded at 137 to receive the nuts 138 and 139 which secure it to the printer positioning foot 81. The latter is slidably supported on the guide member 92 (see Fig. 9).

The printer itself is shown in one form in Figs. 14 to 19 inclusive where the numeral 140 designates the frame which is secured in fixed spaced relation to the scale frame 40.

A sub frame 141 is secured in the main frame 140 and provides a base to which the frame of each of the separate printing mechanisms 142 can be secured. There will be at least as many of these separate printing mechanisms 142 as there are scale mechanisms. Each separate printing mechanism 142 includes a base 143 adapted to be secured to the sub frame 141, a shaft 144 journaled in the base at 145 and 146 where it provides support for a rotatable printing wheel 134. The wheel has a bevel gear 136 secured to it and meshes with a bevel gear 135. The latter is keyed to a shaft 133 which is driven by the rack 131 and pinion 132. The printing wheel 134 has on its face in raised type figures 147 which agree with those on the scale beam 38. The gear ratios and the space between the figures are such that when the positioning foot 81 moves alongside the scale beam for any given change in weight reading, the like readings on the wheel 134 will move into printing position. For example, if the rams have moved the poise 67 and the positioning foot 81 to the 400 pound mark on the scale beam, the 400 pound figure on the printing wheel will be over the platen in the printing position (Fig. 19). Then if the rams move the poise and foot 81 against a stop 80 so the poise is at the 600 pound mark on the scale beam, the 600 pound figure on the printing wheel 134 will be over the platen in the printing position.

Secured to the subframe 141 alongside each printing wheel 134 is a fixed type member 148 bearing the name of the material for which that printing wheel is recording. Thus the wheel 134 marked "Water" in Fig. 14, will have alongside it the member 148 on which appears in raised type the word "Water." This will be true of each printing wheel so that the word "Cement" and the word "Aggregate" will be in printing position alongside the proper wheel (Fig. 19).

To print the selected batch code number any suitable turret 149 may be provided above the platen. The turret 149 will have the same number of slots as the turret 101 and in these slots can be secured type bars 150 bearing in raised letters the identifying data, "Batch A," "Batch B," etc. In Figs. 14 and 15, I show one form of drive for this printing turret 149 which includes a shaft 151 journaled in a frame 152 secured to the subframe 141. A bevel gear 153 on the shaft 151 meshes with a bevel gear 154 on the shaft 155 and the latter has a bevel gear 156 in mesh with a bevel gear 157 on the shaft 125. The ratio between the shaft 125 and the shaft 151 is one to one so the proper type bar 150 will appear in printing position over the platen to agree with the stop 80, in operative position on the turret 101.

To print the time and date, I mount one of the well known Instagraph instruments 158 made by the International Business Machines Company, so that its printing head 159 is in position over the platen ready to print whenever the platen presses the paper 160 and inking ribbon 161 against the type.

To record and print on the paper tape 160 other useful information, any number of printing wheels may be mounted on the subframe or nearby so their raised type or insignia will be in printing position. One such wheel is shown at 162 in Fig. 14 and in Fig. 17. On it will be identifying data of one sort or another, such as a number which will be a code identifying where the batch mixture is to be placed in the structure. The wheel 162 is journaled in the frame 163 and has a sprocket 164 to receive a chain 165 so it can be set by the wheel 166 from a remote location.

The paper 160 is fed from a roll 167 over a support 168 across the platen 169 over a support 170 across a flat support 171 and onto a driven rubber roller 172 having pressure rolls 173 which give the paper 160 sufficient frictional engagement with the roller 172 that the paper is pulled across the platen 169 each time the roller 172 is partially rotated. The inking ribbon 161 is carried on two spools 174, 175 mounted in a frame 176 secured to the printer frame 140. A conventional step by step movement is imparted to the ribbon 161 as well as to the paper 160 each time there is a printing cycle. This conventional mechanism is shown generally by the numerals 177 and need not be described in any greater detail to illustrate my invention as it is well known in the typewriter and allied arts.

The platen 169 is supported on one end of two side frame members 178. The latter are integral with a hollow cross bar 180 through which a support rod 181 extends and around which the platen frame pivots. A cross bar 182 connects the other ends of the side frame members 178, 179 and provides a portion to be engaged by a cam 183 or other power applying means when it is desired to print on the paper. As shown in Fig. 16 the printing is done when the platen is pulled against the paper, ribbon and type by the spring 184. The cam 183 holds the platen away from the paper until the bar 182 rides over the cam peak 185 and falls onto its low spot 186 allowing the spring 184 to snap the platen up against the paper, ribbon and type.

The operator initiates the printing cycle by pressing the button 187 in the switch 187a which energizes a small electric motor 188 geared to the shaft 189 on which the cam 183 is secured. There is also a cam 190 on the shaft 189 which breaks the motor circuit when the shaft 189 has made a full rotation.

ELECTRIC CONTROL CIRCUITS AND OPERATION

Operation of my machine can be explained at the same time as the wiring and operation chart, Fig. 2, is explained.

I shall open this explanation with a reminder that one purpose of the machine is to weigh out simultaneously a plurality of different materials each from its own supply hopper into its own weigh hopper and then to dump simultaneously the weighed material in these hoppers; and that the purpose is to provide during each weighing cycle a printer record in usual weight measures of the pre-determined weight settings of the weight hoppers together with the names of the materials weighed out, including the time of day, the date, and the destination of each mix; and that an additional purpose is to provide a rugged foolproof accurate poise positioning means for each individual scale which the operator controls from a single station and which positioner for each scale is completely free of any operative connection with the poise or the scale mechanism except for the short period when the operator is re-positioning the poises on the scales preparatory to weighing out a different mix; and that an additional purpose is to provide a control circuit whereby any deviation in the weighing beyond permissible tolerances will inactivate the machine until the over or under error is found and corrected.

The invention has been described with three weigh hoppers 20, one for water, one for cement, and one for aggregate. Most actual installations in connection with the batching of concrete would employ more than three of these weigh hoppers 20, as today's concrete is usually made up of rock of several sizes, of ice and other admixes; however, the flexibility of the present invention allows the addition or the subtraction of as many weigh hoppers as are required. In weighing out materials in a chemical or in a food handling plant, one or two weigh hoppers 20 may suffice.

This explanation will begin as if the operator has just completed the weighing and the dumping of a desired mix. On the paper tape 160 in plain view of the operator will appear on one line across the tape a printed record of the mix just dumped. It may read like this: "Batch E—Water 400—Cement 800—Aggregate 1600—Feb. 8 1950—10:50 am—98—Batch #560." There is nothing requiring interpolation of graphs on a strip of scale paper in order to know what the weights were, or the date, time or code number for the batch. What is very important and is responsible for the successful operation of the printing operation is that movement of the printing or recording mechanism is not effected in any case by movement of the scale beams, therefore there is no drag put on the beams to interfere with the accuracy of the weighing and especially at a time when the scale beams approach a position of balance where there is practically no torque left with which to move any measuring accessories, no matter how delicate a load these may impose.

Assume that the operator's schedule shows he is next to weigh up batch B which is to go in some other part of the structure than where batch E is being used. The weigh hoppers 20 have dumped their full loads for batch E and now stand empty. The gates 25 on the bottom of the cement, sand and rock storage hoppers 24 are closed (Fig. 2). The operator first rotates the batch selector wheel 127 (Fig. 1) to position the stop 80 for batch B where it will be engaged in positioning the poise 67. Then he lifts the change lever 98 which inserts the pin 130 in the slot 128. If the slot is not lined up with the pin the valve 95 will not open. A spring pressed ball 129 engages one of the slot openings and assists in keeping the slotted selector wheel 127 in proper position. When the pin goes into the slot the movement of the change lever 98 does two things on each scale: (a) it closes a switch 191 which operates the magnetic air valve 192 and admits air to the lock out ram 70 which will lift the end of the ingredient beam 38 and hold it rigid until the poise 67 and the printer positioning foot 81 have been moved; and (b) it aligns the ports in the fluid valve 95 so that fluid under pressure will flow into the ends of the rams 76 and 77 causing one ram to move to the right and the other to move to the left. The cross arm 79 on each ram rod 78 is shaped to engage the left edge of the poise 67, the left edge of the turret stop 80 and the left edge of the positioning foot 81 on the printer rack. The cross arm 86 on the ram rod 85 is shaped to engage the right edge of the poise 67, the right edge of the turret stop 80 and the right edge of the positioning foot 81 on the printer rack. As these cross arms move toward each other they will properly align the turret stop, the poise, and the positioning foot. The scale marking on the turret where the stop 80 is set will agree with the scale markings on the ingredient beam 38 where the poise is stopped and the printer rack 131 will have rotated its print wheel 134 to bring into printing position the numeral agreeing with the reading on the scale beam 38 and on the turret. Whichever cross arm first reached the poise 67 will have contacted and thereby released the poise brake by lever 72 so that poise can be moved along the scale beam 38. When the poise on each ingredient scale beam is in its correct position for the B batch, the operator releases the change lever 98. This aligns the ports in the fluid valve 95 so that the rams 76 and 77 will retract their ram rods 78 and 85 respectively to the left and to the right. This retracts the cross arms 79 and 86 and leaves the poise 67 on each scale and each ingredient beam 38 free of any contact with the printing mechanism or with the positioning mechanism, and yet with all three in exact agreement with each other. The operator now knows that when he moves the control lever 193 to fill the weigh hoppers 20, each will receive only the correct predetermined weight of ingredient as set on its scale beam 38 for the B batch.

It is important at this point for the operator to know that each weigh hopper 20 has dumped all the material it held during the previous weighing cycle. The present device is so arranged that this condition is a condition precedent to starting the next weighing cycle. In other words, unless each scale is in balance (within the usual tolerances) thereby showing that no material is left in the hoppers, the operator will find the starting and dumping lever 193 locked against any movement.

This lever 193 has a slot 194 which when the lever is in neutral is aligned with a pin 195 having a spring 196 normally holding it in the slot. An electro-magnetic coil 197 is arranged to lift the pin out of the slot whenever the master scale beams all come into balance. They come into balance when empty and preparatory to being filled; and when they each contain the intended weight of materials as shown on their respective ingredient beams 38 and preparatory to being dumped.

*The lock control circuit on the starting and dumping lever*

The circuit for this electromagnetic coil 197 includes a normally open contactor 198 on each scale which contactor is closed whenever the flag 63 on the scale indicator 57 interrupts the light beam of the photo-electric relay 62. As mentioned before, this flag 63 is set on the indicator arm 57 so that it cuts this light beam when the master scale beam comes into balance.

The photoelectric relay, being a well known device, is shown only diagrammatically at 62 and its coil 62a is energized by the circuit 200, 201, 202, and 203. In addition to closing the normally open contactor 198, thereby releasing the lock 195, when the light beam is intercepted as the scale comes into balance, it also opens the normally closed contactor 204, thereby de-energizing the supply hopper gate relay coil 205 on the supply hopper circuit 203, 206, 207, 208, 209, 211, 200 so switches 217 and 232 will open and the coil 210 which holds the gate 25 open will be de-energized and a spring 212 will close the gate.

*The starting circuit*

As just described, the flags 63 on all the scale indicators have intercepted the photo relays 62 so the coil 197 is energized and the control lever 193 has been unlocked, so it can be moved.

The operator moves the lever 193 to the right which closes the normally open switch 213 thereby putting current through the leads 214, 215, 216, to the supply hopper gate relays 205. This closes the normally open gate contactors 217 which energizes the coils 210 and opens each gate valve 25 and material begins to flow into each weigh hopper 20.

Closing the switch 213 also puts current through the leads 214, 218 to the coil 219 which opens the normally closed contactor 220 and de-energizes the holding circuit 221 and its coil 248 so the normally open contactors 222, 223 will open and break the circuit 224, 225, 226, 227, 211 and the coil 228 will be de-energized so the return spring on the air valve 192 moves it to closed position. This withdraws air from the lock out ram 70 which was holding the ingredient beam 38 off the master beam. As the weight of the beam 38 is dropped onto the master beam, the indicator hand 57 carries the flag 63 from in front of each photo relay cell 62. This de-energizes the coil 62a which allows the contactor 198 to open and closes the contactor 204, which through the circuit 209, 216, 229, 230, 231, 206, 263 holds closed the normally open contactor 217 so the operator can then move the lever 193 back to its locked position to await filling of the weigh hoppers 20.

Momentarily closing the switch 213 by the starting lever 193 to start the weighing operation also conditioned the printing circuit, but that will be explained under the section on "The printing circuit."

The condition of the machine now is that the supply hopper gates 25 are open, the flags 63 on the weight indicators are away from the photo relay cells, the material is flowing into the weigh hoppers 20 and the master scale beams are gradually coming nearer to a state of balance. Rarely do they all come into balance at once. What happens as each comes into balance is this:

The flag 63 on the weight indicator intercepts the photo relay cell 62 and this energizes the coil 62a which closes the normally open contactor 198 and opens the normally closed contactor 204. When the contactor 204 opened it broke the circuit for the coil 205 so the normally open contactors 217 and 232 opened and de-energized the supply hopper gate coil 210 so the gate 25 went closed. This stopped the flow of material into the hopper 20.

When each of the scales has come into balance and the above has happened to each circuit, all the contactors 198 will have closed and the lock pin 195 will have been withdrawn from the slot 194 in the lever 193. The operator can now move the lever 193 to the left to initiate the dumping or emptying of the weigh hoppers. Before explaining the "dumping circuit," I shall explain the "printing circuit."

*The printing circuit*

As mentioned above, when the operator momentarily closed the switch 213 by moving the starting lever to the right, current also flowed through the leads 214, 232, 233, 234, 200 and energized the coil 235 which closed the normally open contactors 236 and 237. The coil 235 is then maintained energized by the circuit 203, 238, 239, 240, 241, 233, 234, 200 so the printing circuit is conditioned and will print when the normally open contactors 198 all are closed, when the scale beams all come into balance. When this occurs, the motor 188 rotates the printer cam 183 and the cam 190 which opens the switch 242 when the printing cycle has been completed, breaking the circuit 239, 240 and releasing the holding coil 235. The printer will not start another cycle until the starter lever 193 is moved to the right and closes the contactor 213 long enough for the holding coil 235 to close the contactors 236 and 237.

*The dumping circuit*

At the end of the weighing when each scale has come into balance, the flag 63 on each scale will have intercepted the photo relay cell 62 and the normally open contactors 198 will have closed, thereby closing the circuit to the lock coil 197 which will retract the lock pin 195. This is a signal to the operator that each weigh hopper 20 contains the predetermined weight of material set up for each on its own ingredient scale beam 38.

To dump or empty each weigh hopper 20 requires energizing the coil 243 in each magnetic air valve 23 so the rams 22 can open the gates 21. This occurs when the lever 193 is moved to the left for then the switch 245 is closed and current flows to the coils 243 through the leads 203, 238, 246, 247, 247a, 247b, 227, 211, 200.

Also energized at that time is the coil 248 in the relay which closes the normally open contactors 222 and 223, thereby completing the circuit to the coil 228 in the magnetic air valve 192 through the leads 203, 238, 246, 247, 249, 250, 221, 251, 224, 225, 226, 227, 211, 200. This introduces air to the lock out ram 70 and the weight of each ingredient beam 38 is lifted off its master scale beam. When the coil 248 was energized it opened the normally closed delayed opening contactor 252 so there could be no feed back of current between the leads 218, 253, 250 and 249 when the scale beams come into balance and the contactors 198 close.

The operator holds the lever 193 in the dump position to keep the switch 245 closed until all the weighed materials have emptied from the weigh hoppers 20. If all the hoppers 20 are empty, the flags 63 will have intercepted the photo relay cells 62 because the scales will be in balance and the coil 197 on the lock 195 will be holding the latter withdrawn so the operator can move the lever 193 right on over to the starting position to initiate another mixing cycle. More than likely, the next mix will be for a different combination of materials so the operator will move the lever 193 to its neutral position. Then he will rotate the selector wheel 127 until the desired batch is selected, then he will depress the lever 98 to lock the wheel 127 in place simultaneously with actuating the valve 95 so the rams 76, 77 will reposition the scale poises 67 and the printing wheels 134. Then the lever 98 is released, the rams return to each side of the scale, and the operator moves the lever 193 to the left to start the new weighing cycle on the newly selected mix.

To illustrate the combination of my invention and to comply with the Statute, I have shown at 24 one form of storage hopper; at 20 one form of weigh hopper; at 38 one form of scale beam; at 80 one form of stop; at 101 one form of support for the stops; at 79 and 86 one form of pusher means connected to one form of actuator 76, 77; at 134 one form of printing wheel roller; at 63 one form of photo-electric control; at 127 one form of stop selector mechanism and so on for every part of a complete operative device. Because I have described these forms to illustrate the various elements of the combination does not mean that I intend my invention to be limited to elements so formed. In the manufacture of my device some manufacturers may prefer to substitute another form of an element in place of the one or ones I show. This can be done and the combination will still function in the same way, for the same purpose and to accomplish the same result.

For example, on a small machine the operator might move the cross arms manually to and from the stop and still retain the combination of some of the appended claims. The same is true of the stop which might be moved manually in its holder. The stop holder need not be in the form of a turret as illustrated. Another substitution in the combination might be the use of air or electricity to move the cross-arms. As for these elements in the combination the essential thing is a poise positioning mechanism including in it a stop adjacent the scale beam, means for moving the stop to different positions alongside the beam, positioning means mounted to move alongside and generally parallel with the beam to carry the poise along the beam until it is positioned by the stop and then to move back away from the poise and stop so that during the actual weighing there is no connection or frictional contact between the stop, the poise, and the positioning means.

In other words, it is a manufacturer's or designer's choice as to what forms to adopt for the various elements in the combinations which combinations comprise my invention as set forth in the claims.

I claim:

1. In a weighing machine adapted to weighing out different amounts of a plurality of separately stored materials in successive batches of like or different composition, the combination of a plurality of storage hoppers in which a supply of each of said materials is maintained; means for controlling the flow of each material from its hopper; a plurality of weigh hoppers each adapted to receive a material from its adjacent storage hopper; a separate scale means on which each weigh hopper is supported, each scale having its own scale beam, a poise slidable thereon, and connecting means operatively securing each scale beam to its associated weigh hopper; and a plurality of poise positioning mechanisms with one for each scale beam, each said mechanism including a stop adjacent its scale beam, means for moving said stop to different positions alongside said beam, and pusher means mounted to move alongside and generally parallel with said beam to engage the poise and carry it along on said beam until said pusher means is brought to a halt by said stop whereupon said pusher means may be retracted to effect its disengagement from said poise; whereby each scale is prepared to weigh out its particular material according to the weight setting of the stop adjacent its scale beam and when its poise is once positioned said pusher means may be retracted to effect its disengagement from said poise, so there is no connection between its scale beam or its poise and said pusher means.

2. The device of claim 1 in which there is power actuated means for moving said pusher means to position the poise on each scale beam and means for thereafter retracting the pusher means, so that there is no connection between said pusher means and said poise or said beam during the subsequent weighing operation.

3. The device of claim 2 in which there is a printing means adjacent and connected to each of said scale means, each of said printing means including a movable printing element on which there are a plurality of figures spaced apart and adapted to be brought into position to represent weights in the range which its scale beam is capable of weighing; a printer positioning foot adjacent and movable generally parallel with its scale beam and engageable by the pusher means adjacent said scale beam so it will be positioned in predetermined relation to said poise, and a connection between said foot and said printing element whereby the figures on the latter are brought into printing position to correspond with the setting of the poise on the scale beam.

4. The device of claim 1 in which said poise positioning mechanisms each has a plurality of stops, a rotatable member along which said stops are mounted in staggered circumferential relation, and means for rotatably positioning said member in relation to its associated scale beam so that any one of said stops may be placed in operative position alongside its associated scale beam.

5. The device of claim 4 in which each of said rotatable members comprises a turret-like member having a plurality of longitudinally extending slots stepped circumferentially thereabout in each of which slides one of said stops, and includes means for positioning each stop in its respective slot in any of a plurality of positions therealong.

6. In a weighing machine adapted to weighing out different amounts of a plurality of separately stored materials in successive batches of like or different composition, the combination of a plurality of storage hoppers in which a supply of each of said materials is maintained; means for controlling the flow of each material from its hopper; a plurality of weigh hoppers each adapted to receive a material from its adjacent storage hopper; a separate scale means on which each weigh hopper is supported, each scale having its own scale beam, a poise slidable thereon, and connecting means operatively securing each scale beam to its associated weigh hopper; means controlled by each separate scale means for causing each said flow controlling means to cut off the flow of material from its storage hopper when its weigh hopper scale beam is in balance; locking means preventing dumping from said weigh hoppers until all of said separate scale means are in balance; a poise positioning mechanism for each scale beam, each said mechanism including, a plurality of stops, each of which is adjustable to a predetermined position lengthwise in respect to said scale beam, means for positioning one of said stops at a time in operative relation to its scale beam, power actuated pusher means mounted to move alongside and generally parallel with said beam to carry the poise on said beam therealong until said pusher means is brought to a halt by the stop in operative position, means for moving said pusher means as aforesaid and thereafter for retracting the same; control means for setting the amounts of all the different ingredients of each batch by simultaneously causing one stop from every set of said plurality of stops to come into operative position in relation to each said scale beam, said stop corresponding to the proper amount of material for said batch; control means for simultaneously setting said poises by simultaneously actuating all of said power actuated pusher means; a printing means connected to each of said scale means, each of said printing means including a movable printing element on which there are a plurality of figures spaced apart and adapted to be brought into position to represent weights in the range which its scale beam is capable of weighing; a printer positioning foot adjacent and movable generally parallel with its scale beam and engageable by the pusher means adjacent its scale beam so it will be positioned in predetermined relation to the poise on said scale beam, and a connection between said foot and said printing element whereby the figures on the latter are brought into printing position to correspond with the setting of the poise on said scale beam; whereby each scale is prepared to weigh out its particular material and print said weight according to the weight setting of the stop operatively adjacent its scale beam, and when its poise and printer positioning foot are once positioned there is no connection between its scale beam or its poise and said pusher means or between its scale beam or its poise and said printing means.

7. The device of claim 6 in which there is a control connection from the various weigh hoppers cooperating to prevent printing by said printing means until said hoppers are in balance with their weighing mechanisms.

8. A central mixing plant for weighing out different amounts of a plurality of separately stored materials, having a plurality of storage hoppers, with means for controlling the flow of material therefrom; a weigh hopper for each storage hopper, with means for controlling the emptying of material weighed therein; a scale mechanism supporting each weigh hopper, each scale having its own scale beam with a poise slidable thereon; a poise positioning device for each scale mechanism, each said device including a plurality of longitudinally movable stops, a rotatable frame member in which said stops are mounted, the longitudinal axis of said frame member being generally alignable with its adjacent scale beam, means for rotating and selectively positioning said frame member with one of its stops in operative relation to said scale beam, means for moving each stop along said frame member independently of the other stops; and a poise pusher means secured adjacent said scale beam, having a cross arm mounted to move from each end of said scale beam toward the other end so as to engage said poise and to move it along said scale beam until it is positioned in predetermined relation to the stop then in operative relation to said scale beam, and control means for causing said cross arms to move as aforesaid and then to move away from said scale beam.

9. The device of claim 8 in which there is a printing mechanism for printing on a strip of tape the weight figures at which each poise is set on its scale beam during any given weighing cycle, including for each scale a movable printing element on which there are a plurality of figures spaced apart and adapted to be brought into printing position to represent weights in the range which its connected scale is capable of weighing, a printer positioning foot mounted to move generally parallel with the cross arms of the poise pusher means when engaged by the latter, a connection between said printing element and said foot to move the former as said foot is moved whereby the weight figures on said printing element are brought into printing position to correspond with the same weight figure setting of the poise on the scale beam, means for feeding a record strip through said printing mechanism, and means for making an impression thereon by said printing elements once during each weighing cycle, after all said scale beams are in balance; said printing mechanism having no connection with said scale beam or its poise but being set entirely by said poise-setting mechanism.

10. In a central mixing plant the combination of supply means for different aggregates, a plurality of individual weigh hoppers, each having a means for emptying its contents when desired, and a scale means supporting each hopper, said scale means including a scale beam; means to render said supply means operative to weigh into each of said weigh hoppers its predetermined amount of aggregate; a main discharge control device for emptying the weigh hoppers when aggregates are properly measured therein; and a control circuit to prevent operation of said main discharge control device, said circuit including a photo-electric control means adapted to be operated by the movements of said scale means to render said control circuit usable only when said all of scale means come into balance, whereby said photo-electric control means does not affect the weighing operation of said scale means.

11. The plant of claim 10 in which each said scale beam includes two elements supported on the same pivot, a master beam and an ingredient beam, said master beam being adapted for being in balance when its weigh hopper is empty, said ingredient beam being adapted to normally swing with said master beam and be in balance when its said aggregate is properly measured therein and then to actuate said photo-electric control means by swinging said scale beam; lockout means for disconnecting said ingredient beam from said master beam, so that said master beam will actuate said photo-electric control means when its said weigh hopper is empty; and control means associated with said lock-out means for preventing the further addition of materials to said weigh hoppers until said photo-electric control means is actuated upon indication that said weigh hoppers are empty.

12. In a weighing machine adapted to weighing out in succession and selectively different amounts of a material, the combination of a storage device containing a supply of said material from said storage device; means for controlling the flow of said material; a weigh hopper in which said material may be supported while weighing it; a scale means on which said weigh hopper is supported, said scale having a scale beam, a poise slidable thereon and connecting means operatively securing said scale beam to said weigh hopper; and a poise positioning mechanism, said mechanism including a stop-supporting means adjacent said scale beam having a plurality of stops thereon, each of which may be set to a different position, means for selecting any one of said stops and moving it into an effective position alongside said beam, positioning means mounted to move alongside and generally parallel with said beam to carry said poise along said beam until said positioning means positions said poise in relation to said selected stop, means for moving said positioning means in one direction until said poise in positioned and for then moving said positioning means back away from said poise whereby said scale is prepared to weigh out material according to the weight setting of said stop and during said weighing there is no friction contact or connection between said positioning means and said poise.

13. The device of claim 12 in which there is a scale lock-out means to engage said scale beam to hold it in position, said lock-out means being actuated whenever said positioning mechanism is moving said poise.

14. The device of claim 12 in which there is a printing means adjacent and connected to said scale means, said printing means including a movable printing element on which there are a plurality of figures spaced apart and adapted to be brought into position to represent weights in the range which said scale beam is capable of weighing; a printer positioning foot adjacent and movable generally parallel with said scale beam, and engageable by said positioning mechanism so it will be positioned in predetermined relation to said poise, and a connection between said foot and said printing element whereby the figures on the latter are brought into printing position to correspond with the setting of the poise on the scale beam.

15. The device of claim 12 in which said poise positioning mechanism includes a plurality of stops, a rotatable member along which said stops are mounted in instepped circumferential relation, and means for rotatably positioning said member in relation to said scale beam so that at will any desired one of said stops may be placed in operative position alongside said scale beam.

16. The device of claim 15 in which said rotatable member comprises a turret-like member having a plurality of longitudinally extending slots stepped thereabout circumferentially in each of which slides one of said stops, and includes means for positioning each stop in its respective slot in any of a plurality of positions therealong.

17. In a batching plant having a weigh hopper, a scale beam on which said hopper is suspended, and a poise movable along said beam, the combination of means for moving said poise at the will of the operator to any one of several preselected positions, said means including a stop mechanism with a plurality of stops, each stop being positionable at any pre-selected position alongside the scale beam, a positioning mechanism adapted to engage said poise and to move it into register with the one of said stops then alongside the scale beam, and means under the control of the operator for actuating said positioning mechanism.

18. The batching plant of claim 17 in which the stop mechanism includes a rotatable element extending lengthwise and generally parallel to said beam for rotation about its lengthwise axis, said element having a plurality of lengthwise members disposed around said axis along which said stops may be positioned, one said stop means being located on each said lengthwise member for movement therealong, and means under the control of the operator for moving a selected one of said stops into operative position alongside the scale beam prior to the operator's actuation of the positioning mechanism.

19. In a weighing machine adapted to weighing out different amounts of a plurality of separately stored materials in successive batches of like or different composition, the combination of a plurality of storage hoppers in which a supply of each of said materials is maintained; means for controlling the flow of each material from its hopper; a plurality of weigh hoppers each adapted to receive a material from its adjacent storage hopper; a plurality of separate scale means on each of which one weigh hopper is supported, each scale means having its own scale beam, a poise slidable thereon, and connecting means operatively securing each scale beam to its associated weigh hopper; means for operating said flow controlling means for cutting off the flow of each material when its weigh hopper scale beam is in balance; and a plurality of poise positioning mechanisms with one for each scale beam, each said mechanism including a stop-supporting means adjacent its scale beam and having a plurality of stops thereon, each of which may be preset and adjusted to a different position, means for moving said stop-supporting means so that one stop at a time may be placed in operative position alongside its associated scale beam, pusher means mounted to move alongside and generally parallel to said beam to engage the poise and carry it along on said beam; power-actuated means for simultaneously moving all of said pusher means to position the poise on each scale beam, said pusher means being brought to a halt by engaging the stop which is in operative position; and means for retracting all of said pusher means out of engagement with their said poises, so that there is no connection between said pusher means and said poise or said beam during the subsequent weighing operation.

20. The device of claim 19 in which said stop-supporting means are interconnected so that all of them may be set at once by a single control means for presetting all the weights of each ingredient of a batch, a plurality of batches having first been preset by coordinating the desired weights on each of said several stop-supporting means.

21. The device of claim 19 in which there are also lock-out means for each scale beam for holding it from swinging, all of said lock-out means being automatically actuated upon actuation of said power-actuated means for holding said scale beam in position while said pusher means are moving their poises and being automatically actuated upon actuation of said retracting means for releasing said scale beam when said poise has been set.

22. The device of claim 19 in which each scale beam comprises two elements, a master scale beam and an ingredient beam supported therewith; in which the ingredient beam is the one having the aforesaid poise and its associated poise-setting mechanism; in which there is means for locking out the said ingredient beam from said master beam so that said master beam then is in balance when its weigh hopper is empty, whereby it can be known whether said weigh hoppers have dumped their batch; and means for retracting said lock-out means so that said ingredient beam is linked to its master beam for balancing when the desired amount of material is in said hopper.

23. In a weighing machine, the combination of a storage device containing a supply of material; means for controlling the flow of said material from said storage device; a weigh hopper in which said material may be supported while weighing it; a scale means on which said weigh hopper is supported, said scale means having a scale beam, a poise slidable thereon, and connecting means operatively securing said scale beam to said weigh hopper; and a poise-positioning mechanism, said mechanism including a stop adjacent said scale beam; means for moving said stop to different positions alongside said beam, positioning means mounted to move alongside and generally parallel with said beam to carry said poise along said beam, means for moving said positioning means in one direction until said positioning means engages said stop and thereby further movement is prevented and for then moving said positioning means back away from said poise, whereby said scale is prepared to weigh out material according to the weight setting of said stop and during said weighing there is no friction, contact, or connection between said positioning means and said poise.

24. The machine of claim 23 in which each said scale beam has two parts, a master beam and an ingredient beam, adapted to act as a unit for measuring the material; and means for locking out said ingredient beam so that said master beam alone is on its pivot, said master beam then being adapted to indicate when its said weigh hopper is empty.

25. In a batching plant having a plurality of weigh hoppers, a plurality of scale beams on each of which one hopper is suspended, and a poise movable along said beam, the combination of a rotatable element extending lengthwise and generally parallel to said beam for rotation about its lengthwise axis, said element having a plurality of lengthwise members disposed at different radial positions around said axis; a plurality of stops, each located on one said lengthwise member for movement therealong; single means under the control of the operator for simultaneously moving a selected and corresponding one of said stops in each rotatable element into operative position alongside its said beam; a plurality of poise-positioning mechanisms, each adapted to engage one said poise and to move it into register with its corresponding said stop; and single means under the control of the operator for simultaneously actuating all of said poise-positioning mechanisms.

26. The plant of claim 25 in which said single means for setting all of said rotatable elements simultaneously to set one stop of each element into operative position, comprises a master rotatable element having stop means thereon corresponding in number to the number of lengthwise members on each said individual rotatable element; cooperating stop means adapted to hold said master element in place when one set of stops has been selected, by engaging one of its said stop means; a plurality of pinions, one connected to said master element and one to each said rotatable element for rotation therewith; and rack means engaging all of said pinions so that the individual rotatable elements are rotated when said master element is rotated.

27. A mix selecting device for use with an aggregate batching plant having a weighing means with a scale beam for measuring out quantities of aggregate, having in combination with the scale beam of said weighing means, a poise movable along said beam, a traveler engageable momentarily with said poise for moving it along said beam, means for propelling said traveler in either direction and parallel to said beam; a plurality of individual weight setting means not connected to said scale beam; and individual control means connected to and movable with each of said weight setting means, each control having provision thereon for starting and stopping the aforesaid means for propelling said traveler; and means for selectively placing in operation one of said control means.

28. A mix selecting device for use with an aggregate-batching plant having a weighing means with a scale beam for measuring out quantities of aggregate, having in combination with the scale beam of said weighing means: a poise movable along said beam; a plurality of weight-setting means not connected to said scale beam; poise-moving means adapted to be controlled by any one of each of said weight-setting means for effecting movement of said poise along said beam, to a position corresponding to that of the controlling weight-setting means, said poise-moving means then ceasing to have any operative connection with either the poise or its beam; and means for selectively placing one of said weight-setting means in control of said poise-moving means.

29. In a measuring plant for measuring selectively on a single scale different predetermined weights, the combination of a weight supporting means; a scale beam; linkage connecting said means to said beam; a poise movable along said beam; a power-actuated impeller to engage and move said poise; a plurality of variable positioners adjacent said impeller to be positioned to control the position to which said poise is moved; and means for adjusting each of said positioners to any predetermined stop position.

BERT NOBLE.

REFERENCES CITED

The following references are of record in the file of this patent:

UNITED STATES PATENTS

| Number | Name | Date |
|---|---|---|
| 785,209 | Hamilton | Mar. 21, 1905 |
| 1,157,716 | Outrebon | Oct. 26, 1915 |
| 1,241,672 | Smith | Oct. 2, 1917 |
| 1,254,668 | Foster | Jan. 29, 1918 |
| 2,044,017 | Robb | June 16, 1936 |
| 2,071,443 | Weckerly | Feb. 23, 1937 |
| 2,132,237 | Haegele | Oct. 4, 1938 |
| 2,343,000 | Carliss | Feb. 29, 1944 |
| 2,357,766 | Richardson | Sept. 5, 1944 |
| 2,527,147 | Noble | Oct. 24, 1950 |

FOREIGN PATENTS

| Number | Country | Date |
|---|---|---|
| 390,100 | Germany | Feb. 14, 1924 |